US011755903B2

(12) United States Patent
Zhu et al.

(10) Patent No.: US 11,755,903 B2
(45) Date of Patent: Sep. 12, 2023

(54) SYSTEMS AND METHODS FOR PROVIDING BLOCK-WISE SPARSITY IN A NEURAL NETWORK

(71) Applicant: ALIBABA GROUP HOLDING LIMITED, Grand Cayman (KY)

(72) Inventors: Maohua Zhu, San Mateo, CA (US);
Zhenyu Gu, San Mateo, CA (US);
Yuan Xie, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 1055 days.

(21) Appl. No.: 16/521,564

(22) Filed: Jul. 24, 2019

(65) Prior Publication Data

US 2021/0027156 A1  Jan. 28, 2021

(51) Int. Cl.
*G06N 3/08* (2023.01)
(52) U.S. Cl.
CPC ...................... *G06N 3/08* (2013.01)
(58) Field of Classification Search
None
See application file for complete search history.

(56) References Cited

U.S. PATENT DOCUMENTS

| 2003/0212727 | A1* | 11/2003 | Macy ...................... G06F 7/722 708/620 |
| 2018/0315158 | A1* | 11/2018 | Nurvitadhi ................ G06T 1/20 |
| 2019/0050734 | A1 | 2/2019 | Li et al. |
| 2019/0130271 | A1 | 5/2019 | Narang et al. |
| 2019/0325296 | A1* | 10/2019 | Fowers ................ G06N 3/0454 |
| 2019/0361954 | A1* | 11/2019 | Page .................... G06F 16/9024 |
| 2020/0234114 | A1* | 7/2020 | Rakshit .................... G06N 3/08 |
| 2020/0372342 | A1* | 11/2020 | Nair .................... G06F 16/2246 |

FOREIGN PATENT DOCUMENTS

| CN | 109214508 A | 1/2019 |
| WO | WO 2018/022821 A1 | 2/2018 |

OTHER PUBLICATIONS

PCT International Search Report and Written Opinion dated Oct. 21, 2020, issued in corresponding International Application No. PCT/CN2020/102948 (8 pgs.).

\* cited by examiner

*Primary Examiner* — Charles J Choi
(74) *Attorney, Agent, or Firm* — Finnegan, Henderson, Farabow, Garrett & Dunner, LLP

(57) ABSTRACT

The present disclosure relates to systems and methods for providing block-wise sparsity in neural networks. In one implementation, a system for providing block-wise sparsity in a neural network may include at least one memory storing instructions and at least one processor configured to execute the instructions to: divide a matrix of weights associated with a neural network into a plurality of blocks; extract non-zero elements from one or more of the plurality of blocks; re-encode the extracted non-zero elements as vectors with associated coordinates of the extracted non-zero elements within the one or more blocks; enforce input sparsity in the neural network corresponding to the associated coordinates; and execute the neural network using the vectors and the enforced input sparsity.

19 Claims, 13 Drawing Sheets

SYSTEMS AND METHODS FOR PROVIDING BLOCK-WISE SPARSITY IN A NEURAL NETWORK

TECHNICAL FIELD

The present disclosure relates generally to the field of sparse neural networks. More specifically, and without limitation, this disclosure relates to computer-implemented systems and methods for providing block-wise sparsity in neural networks. The systems and methods disclosed herein may be used in various neural network-based architectures, such as deep neural networks (DNNs), convolutional neural networks (CNNs), recurrent neural networks (RNNs), or the like, and may be configured for architectures such as graphics processing units (GPUs) or the like.

BACKGROUND

Modern neural networks often include many nodes and many layers. However, this reduces efficiency in execution and increases latency. Accordingly, input sparsity, output sparsity, and weight sparsity have all been proposed, individual or in combination, to increase efficiency and reduce latency. Indeed, sparsity in an artificial neural network more accurately reflects how neurons in a human brain process information.

Existing weight sparsity techniques include generic sparsifying and unified sparsifying. Generic sparsifying zeroes all elements in the weight matrix that are not the four (or any other predeteiinined number) largest elements in the matrix. However, this technique does not generally reduce memory usage at least because positions of the non-zero elements are selected from anywhere within the matrix, increasing the number of bits needed to store locations of the non-zero elements relative to the entire matrix. Unified sparsifying zeroes all elements in the weight matrix not within one or more selected columns. This may reduce memory usage because positions of the non-zero elements are limited to a particular column, but accuracy of the output may decrease significantly.

Accordingly, the techniques described above generally offer poor overall speedup (e.g., because memory fetching is a bottleneck in executing most modern neural networks) or lack accuracy. Hardware, such as central processing units (CPUs) or graphics processing units (GPUs) suffer.

SUMMARY

In some embodiments, a system for providing block-wise sparsity in a neural network may comprise at least one memory storing instructions and at least one processor configured to execute the instructions to perform operations. The operations may comprise dividing a matrix of weights associated with a neural network into a plurality of blocks; extracting non-zero elements from one or more of the plurality of blocks; re-encoding the extracted non-zero elements as vectors with associated coordinates of the extracted non-zero elements within the one or more blocks; enforcing input sparsity in the neural network corresponding to the associated coordinates; and executing the neural network using the vectors and the enforced input sparsity.

In some embodiments, a method for providing block-wise sparsity in a neural network may comprise dividing a matrix of weights associated with a neural network into a plurality of blocks; extracting non-zero elements from one or more of the plurality of blocks; re-encoding the extracted non-zero elements as vectors with associated coordinates of the extracted non-zero elements within the one or more blocks; enforcing input sparsity in the neural network corresponding to the associated coordinates; and executing the neural network using the vectors and the enforced input sparsity.

In some embodiments, a non-transitory computer-readable storage medium may store a set of instructions that is executable by at least one processor to cause the processor to perform a method for providing block-wise sparsity in a neural network. The method may comprise dividing a matrix of weights associated with a neural network into a plurality of blocks; extracting non-zero elements from one or more of the plurality of blocks; re-encoding the extracted non-zero elements as vectors with associated coordinates of the extracted non-zero elements within the one or more blocks; enforcing input sparsity in the neural network corresponding to the associated coordinates; and executing the neural network using the vectors and the enforced input sparsity.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

The disclosed embodiments relate to computer-implemented systems and methods for providing block-wise sparse neural networks. Advantageously, the exemplary embodiments can provide improved speed and power efficiency by reducing both mathematical operations and memory transfers required to execute the neural network. Embodiments of the present disclosure may be implemented and used in any neural network-based architectures. Moreover, the disclosed embodiments may be used on any processor, such as central processing units (CPUs) or any other general or specific processing circuitry. Speed may be further increased in some embodiments by implementing the embodiments using a graphics processing units (GPUs).

In view of the foregoing issues with conventional systems, embodiments of the present disclosure provide computer-implemented systems and methods for providing block-wise sparse neural networks. The systems and methods of the present disclosure may provide a technical solution to the technical problem of improving the efficiency of neural networks. The systems and methods of the present disclosure may result in faster speeds and lesser power consumption.

Figure 1:
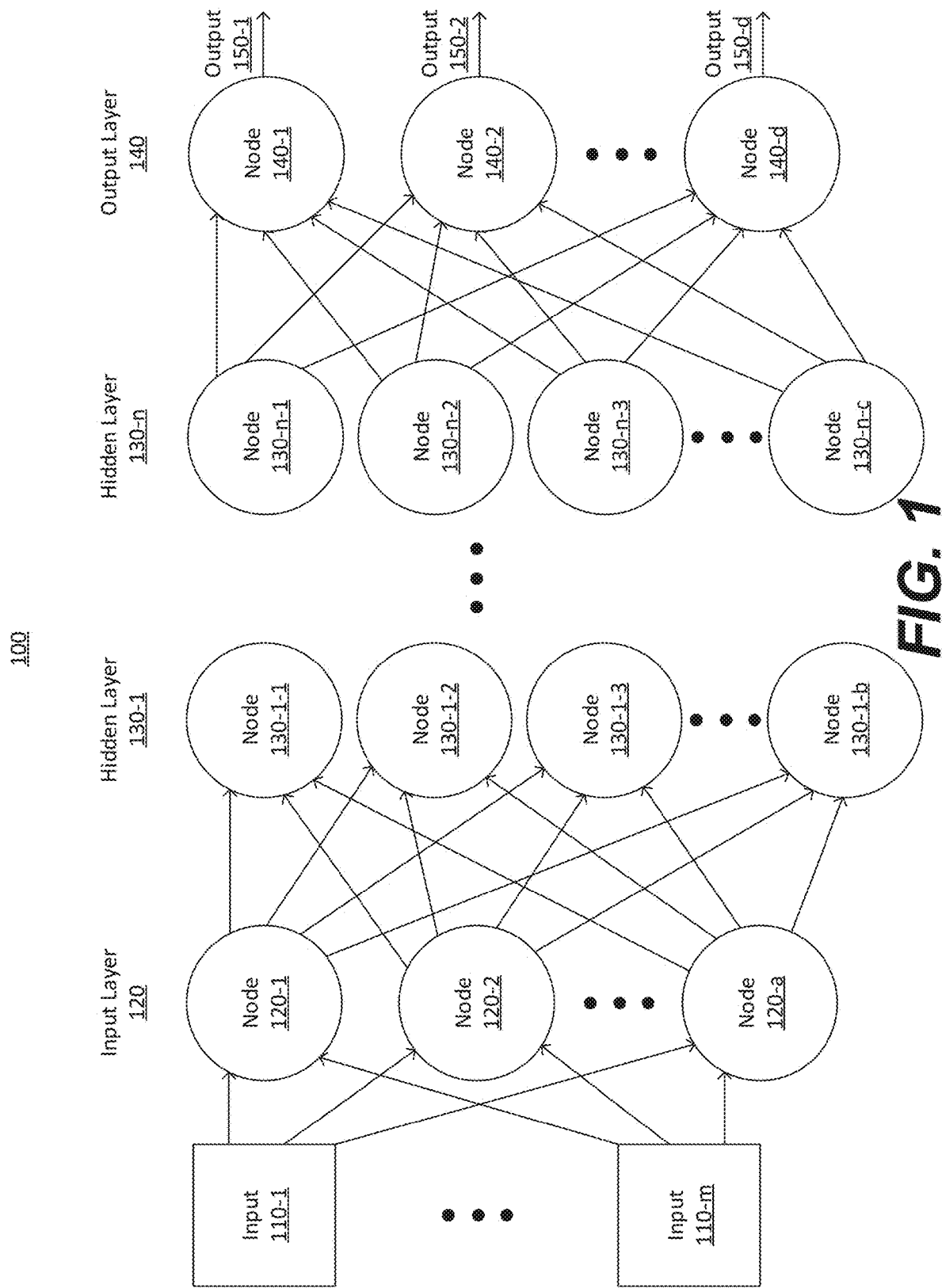
FIG. 1 is a schematic representation of a neural network, according to embodiments of the present disclosure.

FIG. 1 is a schematic representation of an artificial neural network (ANN) 100. As depicted in FIG. 1, neural nework 100 may include an input layer 120 that accepts inputs, e.g., input 110-1, . . . , input 110-m. Inputs may include an image, text, or any other structure or unstructured data for processing by neural nework 100. In some embodiments, neural nework 100 may accept a plurality of inputs simultaneously. For example, in FIG. 1, neural nework 100 may accept up to m inputs simultaneously. Additionally or alternatively, input layer 120 may accept up to m inputs in rapid succession, e.g., such that input 110-1 is accepted by input layer 120 in one cycle, a second input is accepted by input layer 120 in a second cycle in which input layer 120 pushes data from input 110-1 to a first hidden layer, and so on. The number of inputs used in simultaneous input, rapid succession input, or the like.

Input layer 120 may comprise one or more nodes, e.g., node 120-1, node 120-2, . . . , node 120-a. Each node may apply an activation function to corresponding input (e.g., one or more of input 110-1, . . . , input 110-m) and weight the output from the activation function by a particular weight associated with the node. An activation function may comprise a Heaviside step function, a Gaussian function, a multiquadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 1, neural nework 100 may include one or more hidden layers, e.g., hidden layer 130-1, . . . , hidden layer 130-n. Each hidden layer may comprise one or more nodes. For example, in FIG. 1, hidden layer 130-1 comprises node 130-1-1, node 130-1-2, node 130-1-3, . . . , node 130-1-b, and hidden layer 130-n comprises node 130-n-1, node 130-n-2, node 130-n-3, . . . , node 130-n-c. Similar to nodes of input layer 120, nodes of the hidden layers may apply activation functions to output from connected nodes of the previous layer and weight the output from the activation functions by particular weights associated with the nodes.

As further depicted in FIG. 1, neural nework 100 may include an output layer 140 that finalizes outputs, e.g., output 150-1, output 150-2, . . . , output 150-d. Output layer 140 may comprise one or more nodes, e.g., node 140-1, node 140-2, . . . , node 140-d. Similar to nodes of input layer 120 and of the hidden layers, nodes of output layer 140 may apply activation functions to output from connected nodes of the previous layer and weight the output from the activation functions by particular weights associated with the nodes.

Although depicted as fully connected in FIG. 1, the layers of neural network 100 may use any connection scheme. For example, one or more layers (e.g., input layer 120, hidden layer 130-1, ., hidden layer 130-n, output layer 140, or the like) may be connected using a convolutional scheme, a sparsely connected scheme, or the like. Such embodiments may use fewer connections between one layer and a previous layer than depicted in FIG. 1.

Moreover, although depicted as a feedforward network in FIG. 1, neural nework 100 may additionally or alternatively use backpropagation (e.g., by using long short-term memory nodes or the like). Accordingly, although neural nework 100 is depicted similar to a convolutional neural network (CNN), neural nework 100 may comprise a recurrent neural network (RNN) or any other neural network.

Figure 2A:
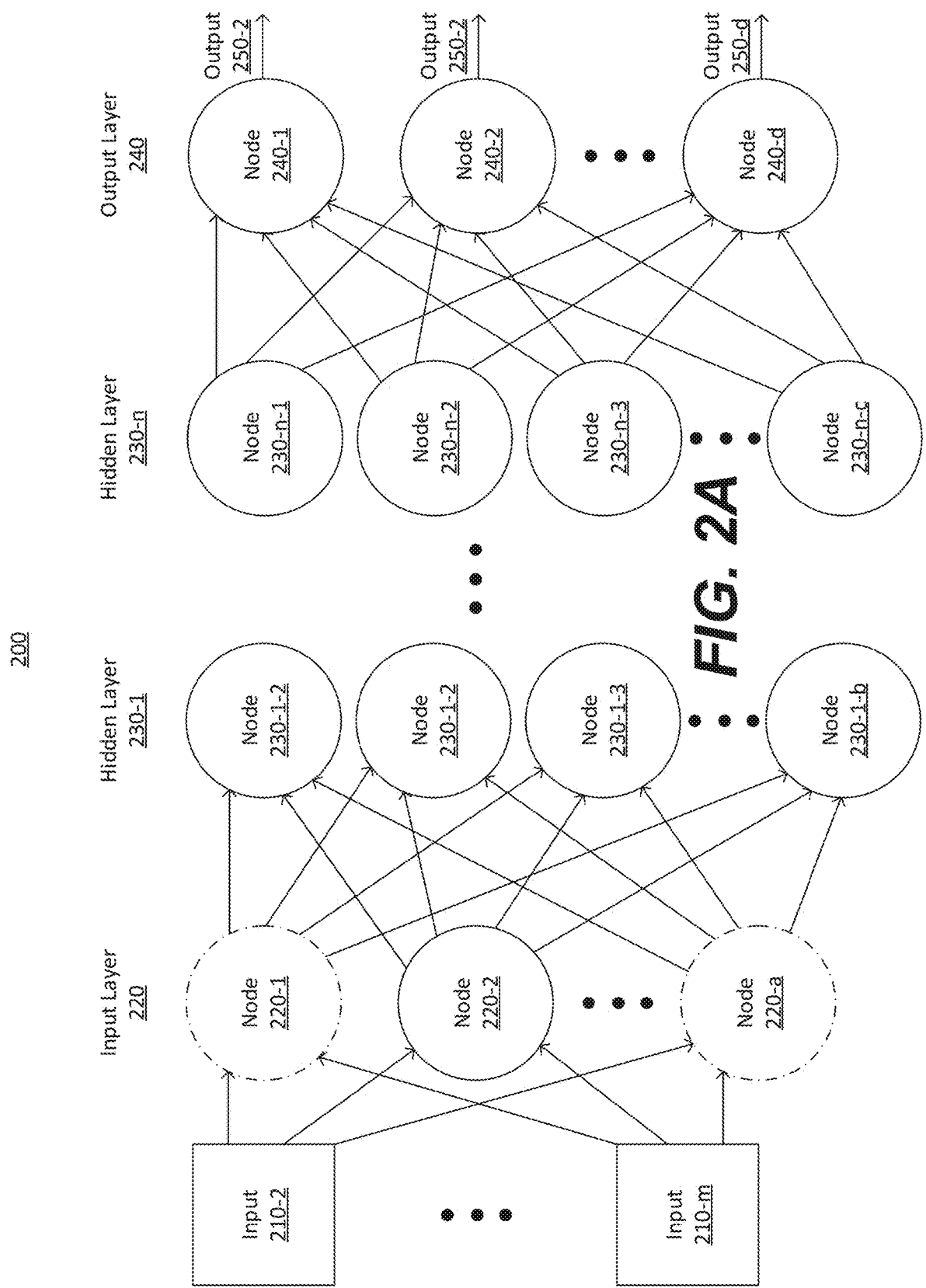
FIG. 2A is a schematic representation of an input sparse neural network, according to embodiments of the present disclosure.

FIG. 2A is a schematic representation of an artificial neural network (ANN) 200 with input sparsity. As depicted in FIG. 2A, and similar to neural nework 100 of FIG. 1, neural network 200 may include an input layer 220 that accepts inputs, e.g., input 210-1, . . . , input 210-m. Input layer 220, similar to input layer 120 of FIG. 1, may comprise one or more nodes, e.g., node 220-1, node 220-2, . . . , node 220-a. As depicted in FIG. 2A, however, nodes 220-1 and 220-a may be zeroed out (e.g., by having an output automatically set to zero or any other set number, such as −1, +1, or the like), deleted (e.g., such that input passes directly through the nodes, such that no output from the nodes is passed to the next layer 230-1, or the like), or otherwise not executed in order to achieve sparsity in input layer 220.

As further depicted in FIG. 2A, and similar to neural nework 100 of FIG. 1, neural network 200 may include one or more hidden layers, e.g., hidden layer 230-1, . . . , hidden layer 230-n. Each hidden layer may comprise one or more nodes. For example, in FIG. 2A, and similar to neural nework 100 of FIG. 1, hidden layer 230-1 comprises node 230-1-1, node 230-1-2, node 230-1-3, . . . , node 230-1-b, and hidden layer 230-n comprises node 230-n-1, node 230-n-2, node 230-n-3, ... , node 230-n-c.

As further depicted in FIG. 2A, and similar to neural nework 100 of FIG. 1, neural network 200 may include an output layer 240 that finalizes outputs, e.g., output 250-1, output 250-2, . . . , output 250-d. Output layer 240, similar to output layer 140 of FIG. 1, may comprise one or more nodes, e.g., node 240-1, node 240-2, . . . , node 240-d.

Figure 2B:
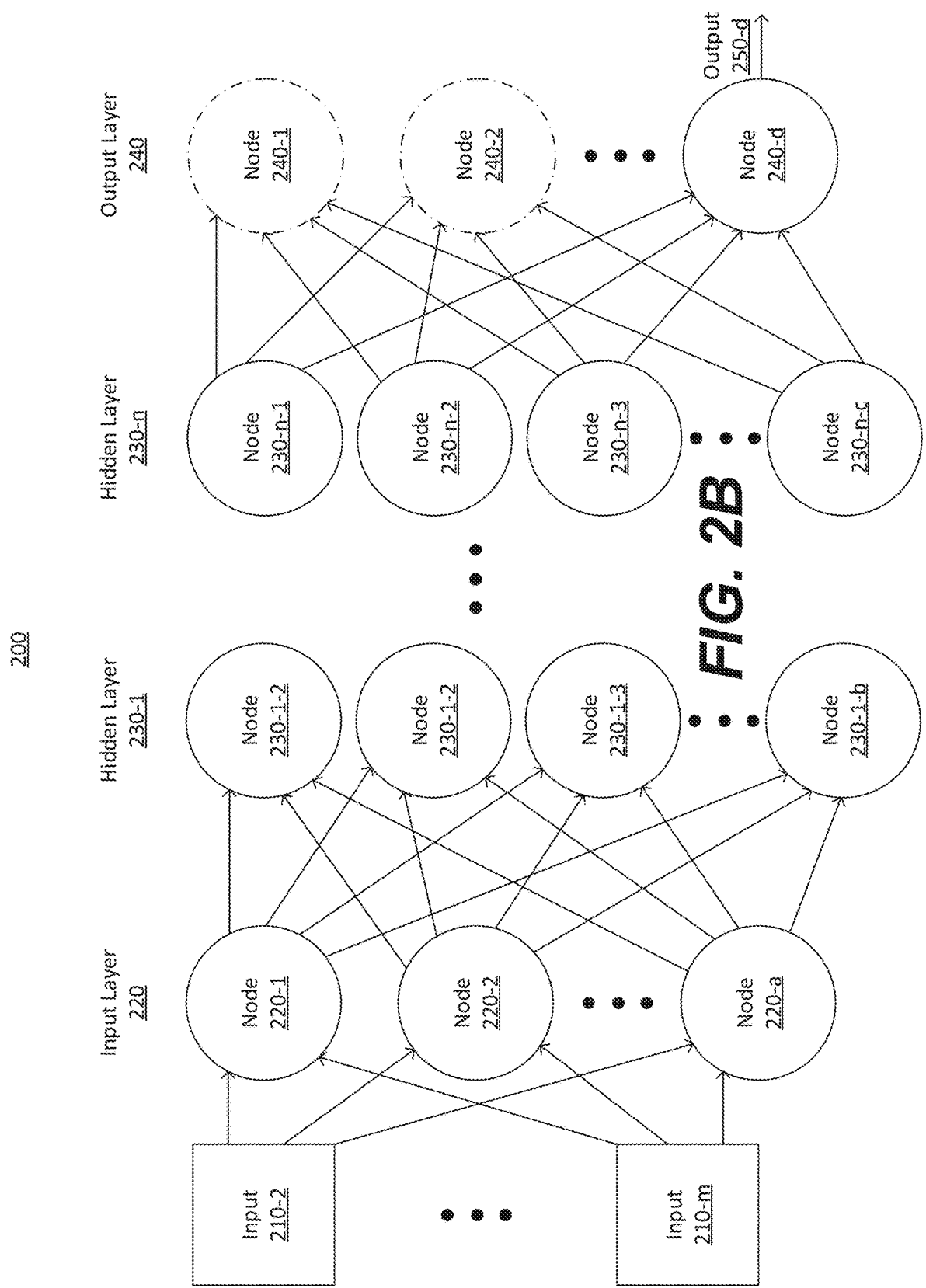
FIG. 2B is a schematic representation of an outputsparse neural network, according to embodiments of the present disclosure.

FIG. 2B is a schematic representation of an artificial neural network (ANN) 200 with output sparsity. Rather than providing sparsity in input layer 220 as depicted in FIG. 2A, neural network 200 of FIG. 2B has nodes 240-1 and 240-2 zeroed out (e.g., by having an output automatically set to zero or any other set number, such as −1, +1, or the like), deleted (e.g., such that input passes directly through the nodes, such that no output from the nodes is passed to the next layer 230-1, or the like), or otherwise unexecuted in order to achieve sparsity in output layer 240.

Although depicted as fully connected in FIGS. 2A and 2B, the layers of neural network 200 may use any connection scheme. For example, one or more layers (e.g., input layer 220, hidden layer 230-1, . . . , hidden layer 230-n, output layer 240, or the like) may be connected using a convolutional scheme, a sparsely connected scheme, or the like. Such embodiments may use fewer connections between one layer and a previous layer than depicted in FIGS. 2A and 2B.

Moreover, although depicted as a feedforward network in FIGS. 2A and 2B, neural network 200 may additionally or alternatively use backpropagation (e.g., by using long short-term memory nodes or the like). Accordingly, although neural network 200 is depicted similar to a convolutional neural network (CNN), neural network 200 may comprise a recurrent neural network (RNN) or any other neural network.

Although not depicted in FIGS. 2A and 2B, weight sparsity (e.g., by setting to zero or to any other set number, such as −1, +1, or the like at least some of the weights multiplied by input vectors before a node operates on the input vectors) represents an additional technique for enforcing sparsity in a neural network. Embodiments of the present disclosure may implement weight sparsity and enforce corresponding input sparsity as depicted in FIG. 2A. Other embodiments may additionally or alternatively enforce output sparsity based on the implemented weight sparsity.

Figure 3A:
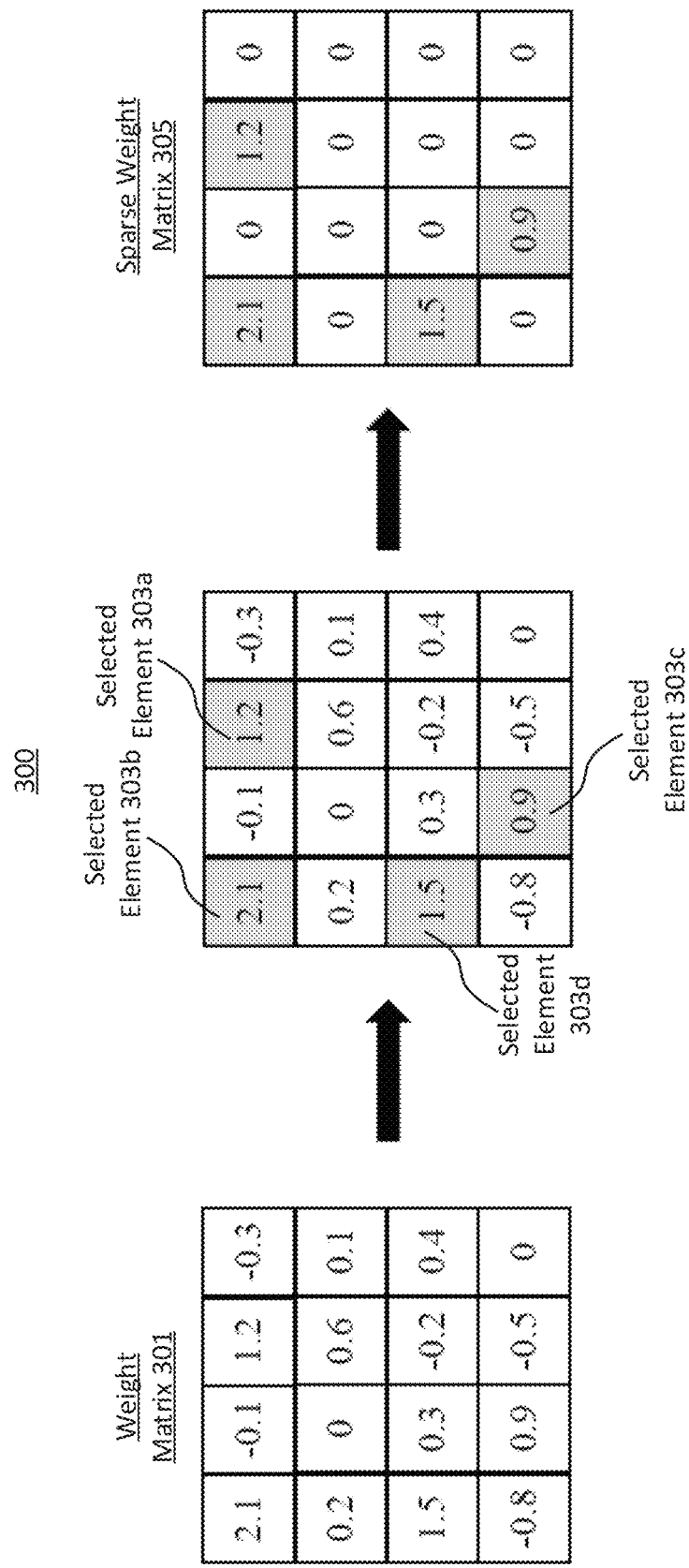
FIG. 3A is a schematic representation of generic sparsifying of a weight matrix, according to embodiments of the present disclosure.

FIG. 3A is a representation of a generic sparsifying 300 of a weight matrix 301 of a neural network, consistent with embodiments of the present disclosure. For example, generic sparsifying 300 may reduce weight matrix 301 to a sparse weight matrix 305 to reduce a number of calculations required for executing the neural network. Although depicted as a 4×4 weight matrix, weight matrix 301 may be any size.

Accordingly, as depicted in FIG. 3A, generic sparsifying 300 may include selecting one or more elements, e.g., elements 303a, 303b, 303c, and 303d from weight matrix 301. Although depicted as selecting four elements, generic sparsifying 300 may use any predetermined number of elements. Elements 303a, 303b, 303c, and 303d may be selected on account of having the four largest absolute values. Generic sparsifying 300 may further include zeroing out non-selected elements, as shown in sparse weight matrix 305. Accordingly, as depicted in FIG. 3A, generic sparsifying 300 has enforced 75% weight sparsity on weight matrix 301. Moreover, the degree of sparsity may depend on the predetermined number of elements and the size of weight matrix 301.

Figure 3B:
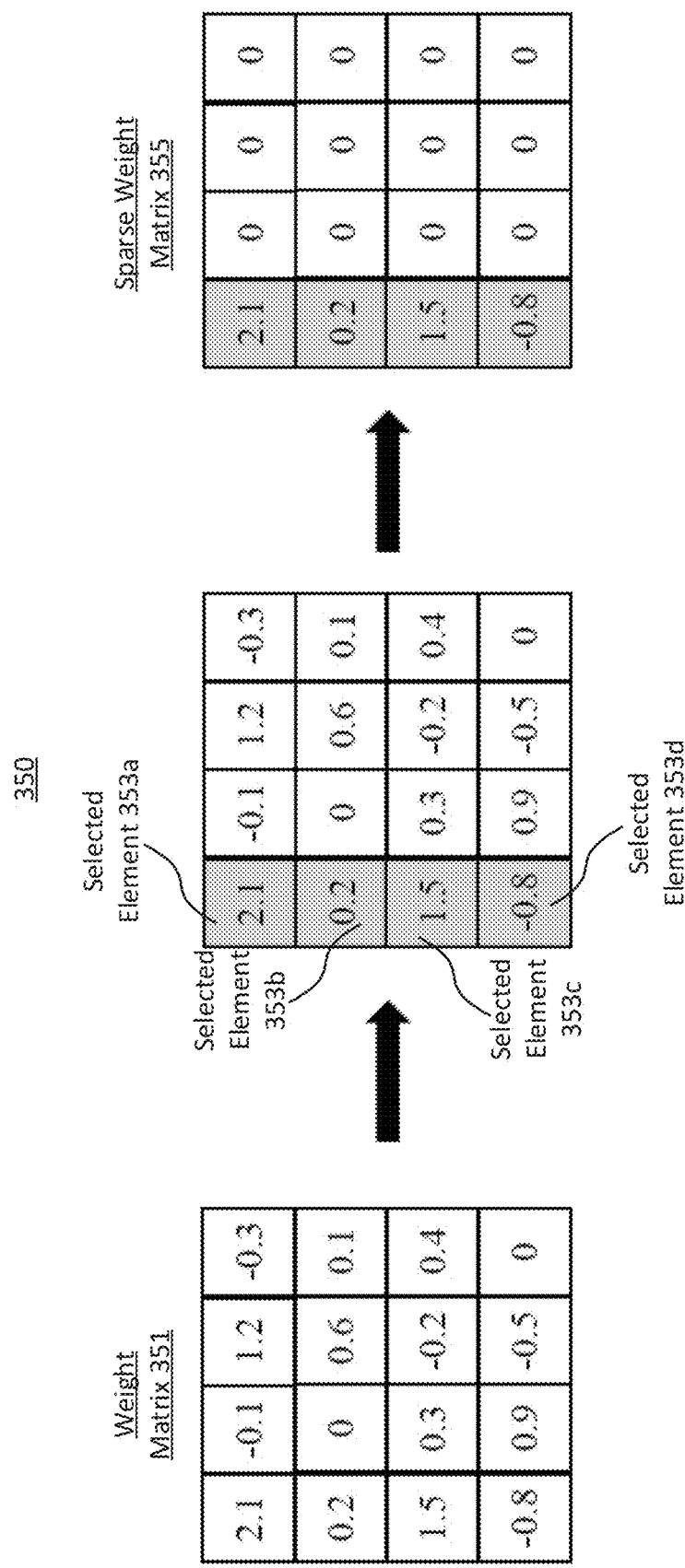
FIG. 3B is a schematic representation of unified sparsifying of a weight matrix, according to embodiments of the present disclosure.

FIG. 3B is a representation of a unified sparsifying 350 of a weight matrix 351 of a neural network, consistent with embodiments of the present disclosure. For example, unified sparsifying 350 may reduce weight matrix 351 to a sparse weight matrix 355 to reduce a number of calculations required for executing the neural network. Although depicted as a 4×4 weight matrix, weight matrix 301 may be any size.

Accordingly, as depicted in FIG. 3B, unified sparsifying 350 may include selecting one or more elements, e.g., elements 353a, 353b, 353c, and 353d from weight matrix 301. Although depicted as selecting four elements, unified sparsifying 350 may use any predetermined number of elements. Elements 353a, 353b, 353c, and 353d may be selected on account of being within a selected column. Although depicted as selecting one column, unified sparsifying 350 may select any predetermined numbers of columns. Unified sparsifying 350 may further include zeroing out non-selected elements, as shown in sparse weight matrix 305. Accordingly, as depicted in FIG. 3B, unified sparsifying 350 has enforced 75% weight sparsity on weight matrix 351. Moreover, the degree of sparsity may depend on the predetermined number of columns and the size of weight matrix 351.

Generic sparsifying 300 may, however, fail to provide spatial predictability in selecting elements not to set to zero because the elements with the largest absolute values may be distributed anywhere in weight matrix 301. Accordingly, for large weight matrices 301, tracking multiplication of corresponding sparse inputs with reduced weight matrix 301 may require significant memory. Unified sparsifying 350 may, however, fail to provide acceptable accuracy levels in the neural network. Embodiments of the present disclosure may achieve speedups like unified spar sifying 350 without similar losses in accuracy. For example, embodiments of the present disclosure may divide weight matrices into blocks (as depicted in FIG. 4) and enforce sparsity on each block (as depicted in FIG. 5).

Figure 4:
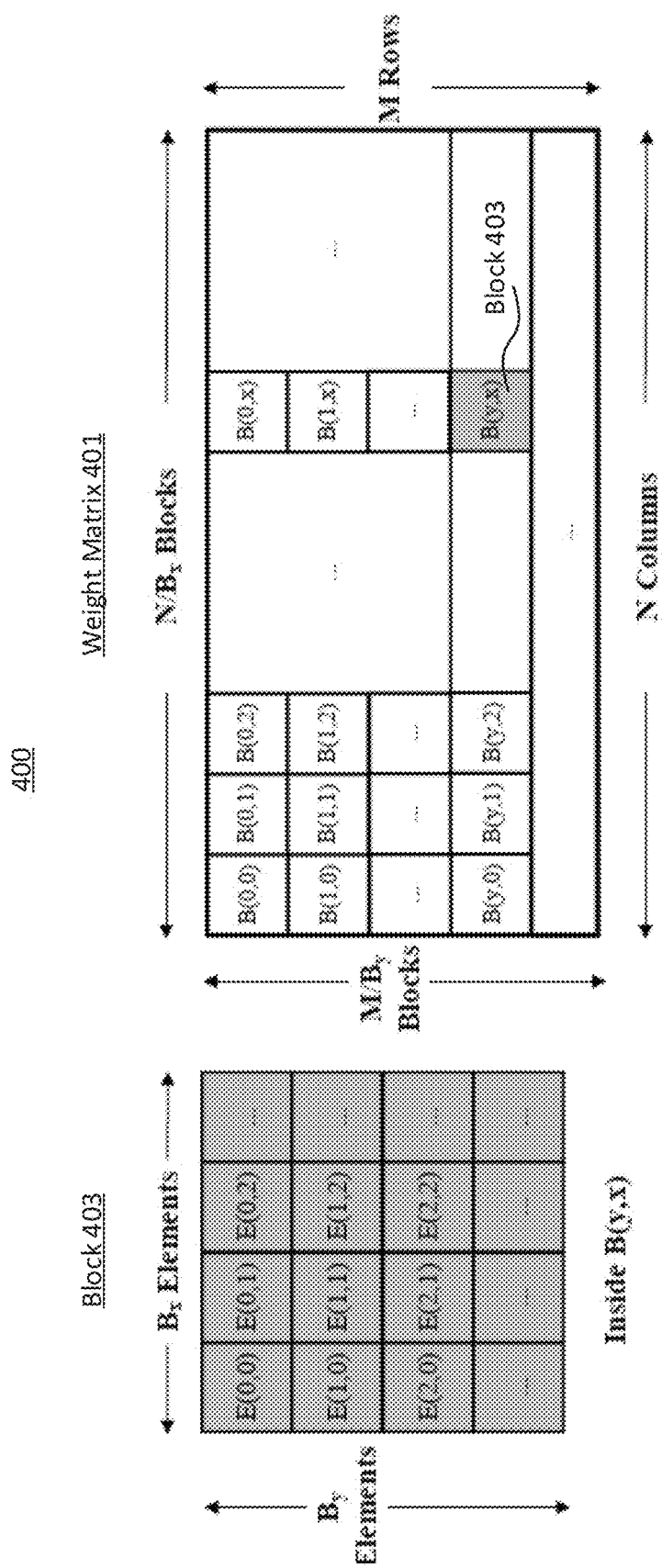
FIG. 4 is a schematic representation of dividing a weight matrix into a plurality of blocks, according to embodiments of the present disclosure.

FIG. 4 is a representation of a block-wise division 400 of a weight matrix 401 of a neural network, consistent with embodiments of the present disclosure. For example, division 400 may divide weight matrix 401 into blocks of size $B_y \times B_x$. Weight matrix 401 is depicted as an M×N matrix. In some embodiments, if the M×N matrix does not divide evenly into blocks of $B_y \times B_x$, division 400 may include padding one or more residual blocks with zeroes such that each block is the same size, i.e., $B_y \times B_x$.

As further shown in FIG. 4, by dividing weight matrix 401 into blocks, each block may be identified by coordinates (e.g., B(0,0), B(0,1), B(1,0), and the like), and each element within a block may be identified by coordinates (e.g., E(0,0), E(0,1), E(1,0), and the like), but the coordinate systems may use smaller data footprints that if each element in weight matrix 401 were directly assigned coordinates.

Figure 5:
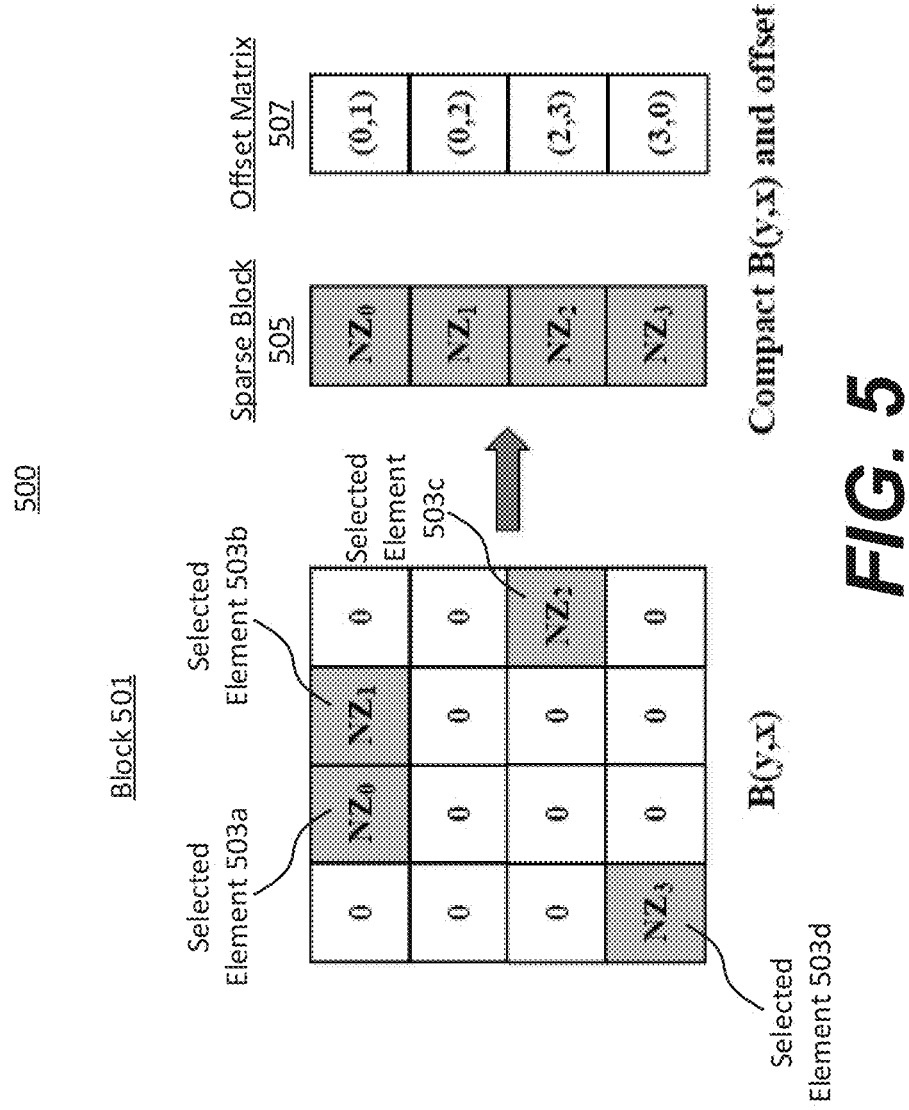
FIG. 5 is a schematic representation of generating block-wise sparsity in a weight matrix, according to embodiments of the present disclosure.

FIG. 5 is a representation of block-wise sparsifying 500 of a block 501 within a weight matrix of a neural network, consistent with embodiments of the present disclosure. For example, block-wise sparsifying 500 may reduce block 501 to a sparse block 505 to reduce a number of calculations for executing the neural network. Although depicted as a 4×4 block, block 501 may be any size.

Accordingly, as depicted in FIG. 5, block-wise sparsifying 500 may include selecting one or more elements, e.g., elements 503a, 503b, 503c, and 503d from block 501. Although depicted as selecting four elements, block-wise sparsifying 500 may use any predetermined number of elements. Elements 503a, 503b, 503c, and 503d may be selected on account of having the four largest absolute values. Block-wise sparsifying 500 may further include storing the selected elements (e.g., elements 503a, 503b, 503c, and 503d) as a sparse block 505. In the example of FIG. 5, sparse block 505 is stored as a one-dimensional vector; however, block-wise sparsifying 500 may use any other appropriate data structure mechanism, such as an array, an ordered list, or the like.

As further depicted in FIG. 5, block-wise sparsifying 500 may include determining associates coordinates of the selected elements (e.g., elements 503a, 503b, 503c, and 503d) within block 501. Accordingly, offset matrix 507 may store the determined coordinates. In some embodiments, offset matrix may store each coordinate with only a few bits. In the example of FIG. 5, because a first dimension (e.g., a y-dimension) of block 501 has length four and a second dimension (e.g., an x-dimension) of block 501 has length four, coordinates of each selected element may be stored in four bits total. In this example, the first two bits identify, of the four rows of block 501, from which one of the selected element originates, and the second two bits identify, of the four columns of block 501, from which one of the selected element originates. This storage mechanism is exemplary; other storage mechanisms may be implemented. For example, in embodiments where the selected elements (e.g., elements 503a, 503b, 503c, and 503d) are encoded as 32-bit floating point numbers, 16-bit floating point numbers, or the like, the associated coordinates may be stored within mantissas of the selected elements.

Accordingly, as depicted in FIG. 5, generic sparsifying 300 has enforced 75% weight sparsity on block 501. In other embodiments, the degree of sparsity may depend on the predetermined number of elements and the size of block 501. Moreover, because block 501 represents a portion of a full weight matrix, the associated coordinates of offset matrix 507 require smaller memory footprints than if the associated coordinates were determined with represent to the entire weight matrix. For example, as explained above, each selected element may be identified within a few bits, a mantissa of the selected element itself, or any other data structure with a smaller memory footprint than if the associated coordinates were determined with represent to the entire weight matrix.

Figure 6:
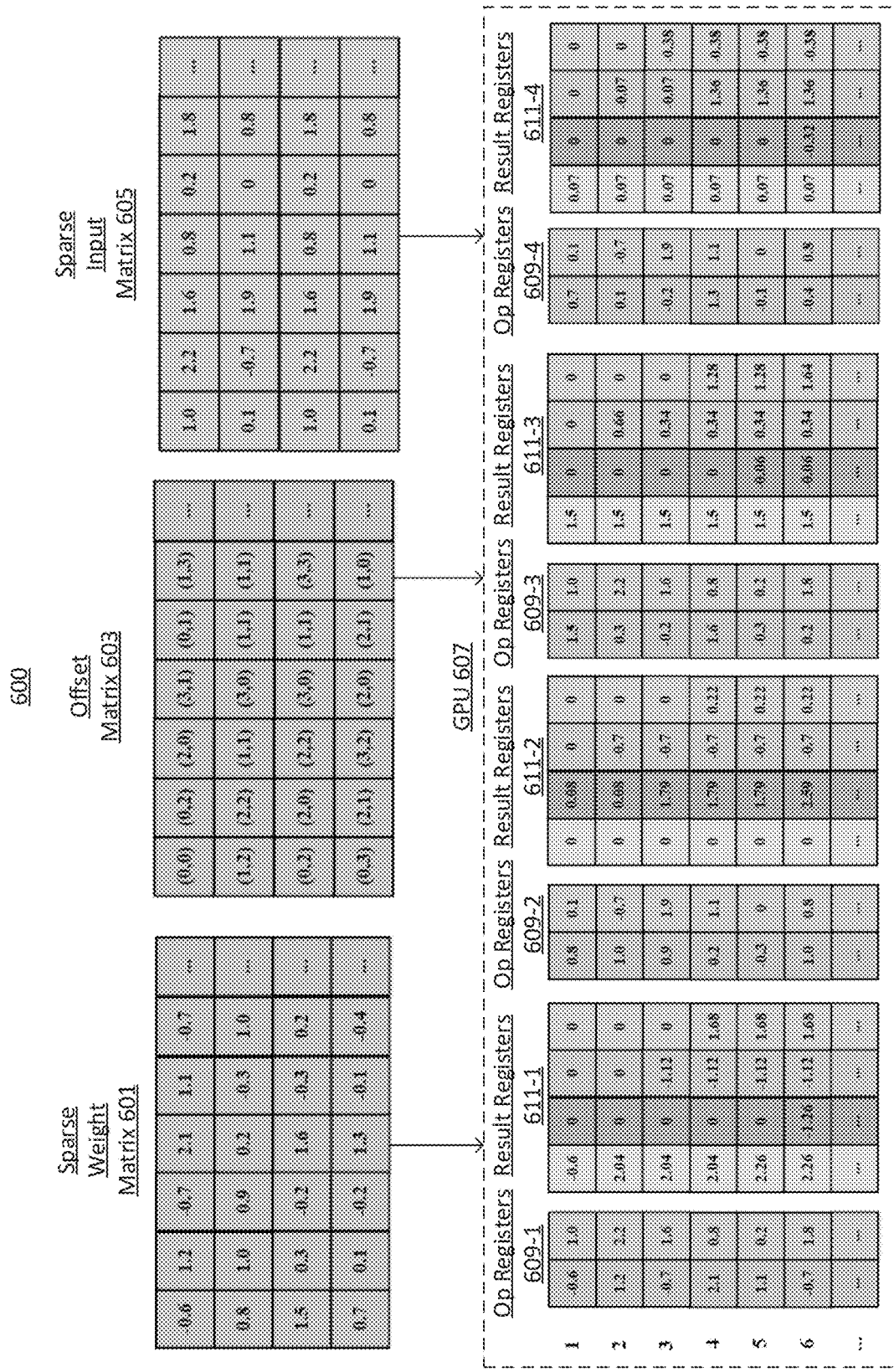
FIG. 6 is a schematic representation of executing block-wise sparsity in a neural network using a GPU, according to embodiments of the present disclosure.

Accordingly, block-wise sparsity may be implemented as shown in FIGS. 5 and 6. FIG. 6 depicts an example execution 600 of a neural network using block-wise sparsity on an accelerator, e.g., GPU 607. As depicted in FIG. 6, an off-chip processor (e.g., a CPU, a different GPU than GPU 607, a dedicated hardware accelerator, or the like) may execute block-wise sparsity (e.g., by implementing a combination of division 400 of FIG. 4 and block-wise sparsifying 500 of FIG. 5) on a weight matrix to generate sparse weight matrix 601. Although not depicted in FIG. 6, in some embodiments, one or more processors of GPU 607 may additionally or alternatively generate sparse weight matrix 601.

As further depicted in FIG. 6, the same or a different off-chip processor (e.g., a CPU, a different GPU than GPU 607, a dedicated hardware accelerator, or the like) may determine associated coordinates of the elements of sparse weight matrix 601 relative to the blocks of the weight matrix to which the elements belonged and store the coordinates in offset matrix 603. Although not depicted in FIG. 6, in some embodiments, one or more processors of GPU 607 may additionally or alternatively generate offset matrix 603.

Using offset matrix 601, the same or a different off-chip processor (e.g., a CPU, a different GPU than GPU 607, a dedicated hardware accelerator, or the like) may extract input values from an input matrix corresponding to the elements of sparse weight matrix 601 to obtain sparse input matrix 605. Accordingly, example 600 of FIG. 6 implements input sparsity as well as weight sparsity by using block-wise sparsification (e.g., as described with respect to FIGS. 4 and 5). Although not depicted in FIG. 6, in some embodiments, one or more processors of GPU 607 may additionally or alternatively generate sparse input matrix 605.

As further shown in FIG. 6, GPU 607 may receive the sparse weight matrix 601, offset matrix 603, and sparse input matrix 605. For example, GPU 607 may fetch the matrices from an off-chip memory to an on-chip memory of GPU 607. In embodiments where GPU 607 generates all or part of at least one of sparse weight matrix 601, offset matrix 603, or sparse input matrix 605, GPU 607 may already have fetched one or both of the full weight matrix or the full input matrix from an off-chip memory to an on-chip memory of GPU 607. Accordingly, GPU 607 may additionally store sparse weight matrix 601, offset matrix 603, and sparse input matrix 605 in the on-chip memory or optionally overwrite one or both of the full weight matrix or the full input matrix in the on-chip memory with sparse weight matrix 601, offset matrix 603, and sparse input matrix 605.

Additionally, as shown in FIG. 6, GPU 607 may pull weights and input values from sparse weight matrix 601 and sparse input matrix 605, respectively, into operations registers (e.g., registers 609-1, 609-2, 609-3, and 609-4) for multiply-accumulate operations. In the example of FIG. 6, GPU 607 uses four parallel threads and thus four sets of operation registers because sparse weight matrix 601 has four rows of weights. In other embodiments, any number of parallel threads may be used, e.g., when sparse weight matrix 601 has different numbers of rows.

In addition to a pair of operations registers, each thread within GPU 607 may use result registers (e.g., registers 611-1, 611-2, 611-3, and 611-4) to store current output from the multiply-accumulate operations. In the example of FIG. 6, GPU 607 uses four result registers because sparse weight matrix 601 has four rows of weights. Accordingly, as shown in FIG. 6, GPU 607 stores a result of each multiply-accumulate operation in a register corresponding to a row of the weight and the input in the operations registers as determined by offset matrix 603. In other embodiments, any number of result registers may be used, e.g., when sparse weight matrix 601 has different numbers of rows.

Any of the information stored in registers may alternatively be stored in an on-chip memory of GPU 607 or in an off-chip memory. However, such embodiments may increase memory latency compared to embodiments using on-chip registers of GPU 607.

Although not depicted in FIG. 6, a final multiply-accumulate across each corresponding result register from each thread (e.g., across each result register of registers 611-1, 611-2, 611-3, and 611-4 corresponding to row 0, across each result register of registers 611-1 611-2, 611-3, and 611-4 corresponding to row 1, and the like) may result in the final output from the block-wise execution depicted in FIG. 6. In some embodiments, GPU 607 may provide a Kepler shuffle function to multiply-accumulate values across the result registers without transferring the values to and from an on-chip memory, further decreasing memory latency. In other embodiments, GPU 607 may use an on-chip memory or an off-chip memory for the final multiply-accumulate functions.

Additionally with or alternatively to example 600 of FIG. 6, executing a block-wise sparse neural network on a GPU may be performed using the example pseudocode below:

```
1    int tidy = threadIdx.x + blockIdx.x + blockDim.x
2    int tidx = threadIdx.y + blockIdx.y + blockDim.y
3    float r_W, r_output[W_b] = 0.0
4    int r_offset
5    for i = 0 to W/W_b do
6        r_W = sparse_W[tidy × W/W_b + i]
7        r_offset = offset[tidy × W/W_b + i]
8        int coordx = tidx + (r_offset.x + i × W_b) × W_input
9        r_output[r_offset.y] += r_W × input[coordx]
10   end
11   for i = 0 to W_b do
```

```
12            if i != tidy % W_b then
13                r output[tidy % W_b] += shfl(r_ouput[tidy % W_b],
i, width = W_b)
14            end
15        end
16        output[tidy × W_input + tidx] = r_output[tidy % W_b]
```

In the pseudocode above, the blocks of the weight matrix r_W are of size $H_b \times W_b$. The offset matrix r_offset is used to load corresponding elements from input and select an output register r_output. Finally, as explained above, lines 11-13 use a Kepler shuffle function to obtain the final output without writing to and reading from a memory (whether on-chip or off-chip).

Figure 7A:
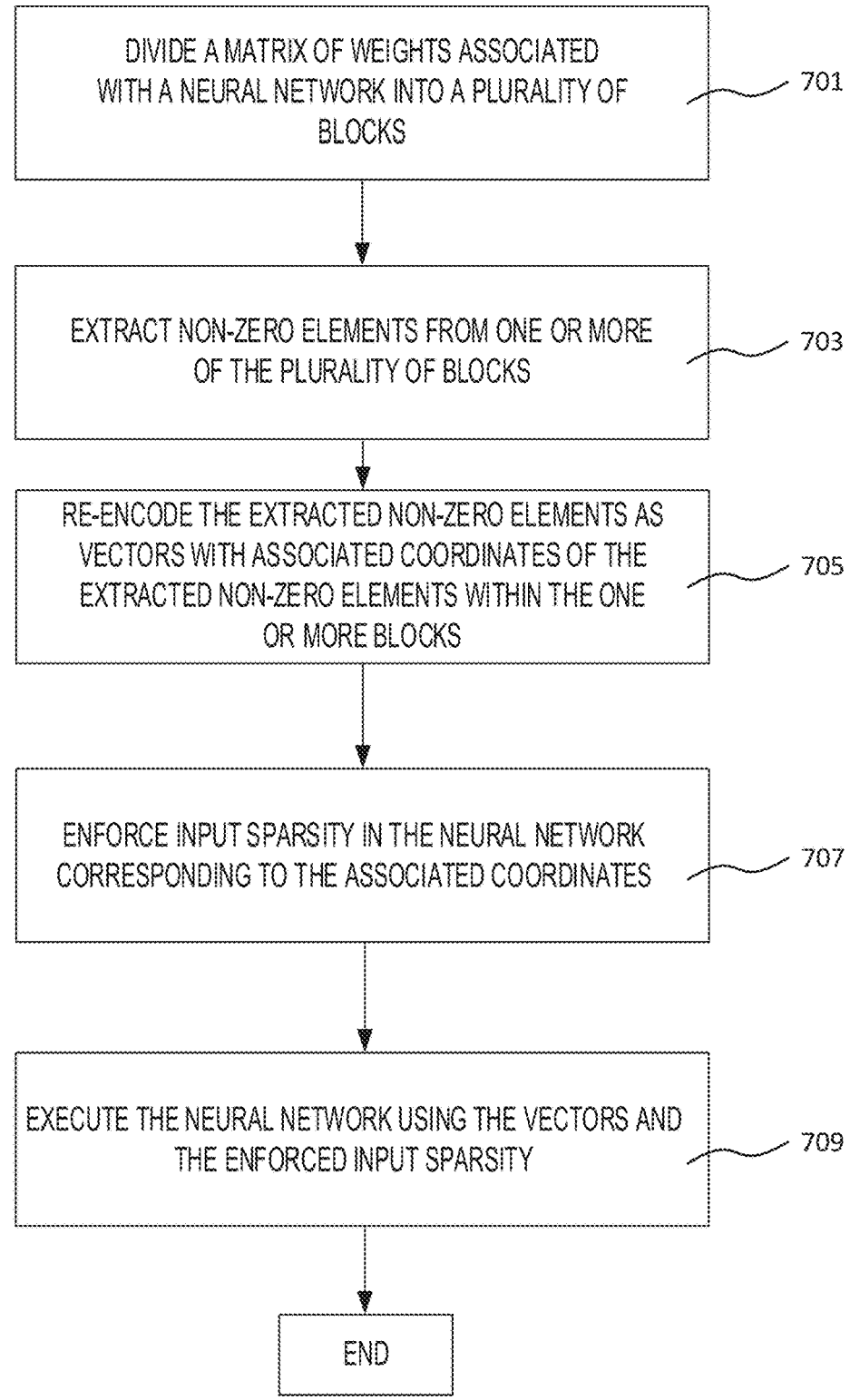
FIG. 7A is a flowchart of an exemplary method for providing block-wise sparsity in a neural network, according to embodiments of the present disclosure.

FIG. 7A is a flowchart of an exemplary method 700 for providing block-wise sparsity in a neural network. Method 700 may be performed by at least one processor (e.g., processor 801 of FIG. 8, GPU 607 of FIG. 6, or the like). Accordingly, in some embodiments, the at least one processor and the at least one memory may be part of a graphics processing unit (GPU). Although described with respect to a single processor, some steps of method 700 may be performed by one or more first processors (e.g., steps 701, 703, 705, and 707 of method 700 may be executed by one or more CPUs) while other steps of method 700 may be performed by one or more second processors (e.g., step 709 of method 700 may be executed by one or more GPUs).

At step 701, the at least one processor may divide a matrix of weights associated with a neural network into a plurality of blocks. For example, the at least one processor may divide a weight matrix 401 into a plurality of blocks (e.g., into block 403 and similar) as explained in division 400 of FIG. 4, described above.

In some embodiments, the at least one processor may further pad a residue block of the plurality of blocks using zeroes. For example, as explained above with respect to division 400 of FIG. 4, if the M×N matrix does not divide evenly into blocks of $B_y \times B_x$, the at least one processor may pad one or more residual blocks with zeroes such that each block is the same size, i.e., $B_y \times B_x$.

At step 703, the at least one processor may extract non-zero elements from one or more of the plurality of blocks. For example, as depicted in block-wise sparsification 500 of FIG. 5, the at least one processor may extract a predetermined number of non-zero elements (e.g., selected elements 503a, 503b, 503c, and 503d) from block 501 based on a ranking of absolute values of the elements of block 501.

At step 705, the at least one processor may re-encode the extracted non-zero elements as vectors with associated coordinates of the extracted non-zero elements within the one or more blocks. For example, as depicted in block-wise sparsification 500 of FIG. 5, the at least one processor may generate sparse block 505 as a one-dimensional vector storing the extracted elements (e.g., selected elements 503a, 503b, 503c, and 503d) from block 501. Moreover, as further depicted in block-wise sparsification 500 of FIG. 5, the at least one processor may determine coordinates of the extracted elements (e.g., selected elements 503a, 503b, 503c, and 503d) from block 501) within block 501 and store the coordinates in offset matrix 507.

In some embodiments, re-encoding the extracted non-zero elements may comprise re-encoding a predetermined number of the extracted non-zero elements. For example, as depicted in block-wise sparsification 500 of FIG. 5, the at least one processor may extract four (or any other predetermined number) of non-zero elements from block 501. In embodiments where a block has fewer non-zero elements than the predetermined number, the at least one processor may pad the re-encoded vectors with zeroes such that each vector is the same length (e.g., a length corresponding to the predetermined number). In such embodiments, the at least one processor may further, when there are more extracted non-zero elements for a block than the predetermined number, select a number of largest elements (e.g., largest absolute value) of the extracted non-zero elements corresponding to the predetermined number for re-encoding. Additionally or alternatively, the at least one processor may further, when there are fewer extracted non-zero elements for a block than the predetermined number, pad the extracted non-zero elements with zero elements to obtain a total number of elements corresponding to the predetermined number for re-encoding, as explained above.

In any of the embodiments described herein, each weight may be stored as one of a 32-bit floating point number of a 16-bit floating point number. Additionally or alternatively, the associated coordinates may be stored as four bits, a first two of the four bits indicating a location of the non-zero element within a corresponding block along a first dimension, and a second two of the four bits indicating a location of the non-zero element within the corresponding block along a second dimension. Accordingly, as explained above with respect to block-wise sparsification 500 of FIG. 5, the at least one processor may encode a position of the element (e.g., element 503a, 503b, 503c, or 503d) along a y-dimension of block 501 as the first two bits and a position of the element (e.g., element 503a, 503b, 503c, or 503d) along an x-dimension of block 501 as the second two bits. Any number of bits may be used depending on the length of the corresponding dimension, and the dimensions may be encoded in any order within the bits. Additionally with or alternatively to separate bits, the bits may be stored in a mantissa of the non-zero element.

At step 707, the at least one processor may enforce input sparsity in the neural network corresponding to the associated coordinates. For example, as depicted in example 600 of FIG. 6, the at least one processor may extract elements from a full input matrix based on offset matrix 603 to obtain sparse input matrix 605.

In some embodiments, enforcing input sparsity in the neural network may comprise fetching elements of an input matrix corresponding to the associated coordinates from an off-chip memory to the at least one memory. For example, as depicted in example 600 of FIG. 6, the at least one processor may extract elements from a full input matrix based on offset matrix 603 to obtain sparse input matrix 605 before transferring sparse input matrix 605 to the at least one memory (e.g., an on-chip memory of GPU 607) from the off-chip memory. Additionally or alternatively, the matrix of weights may be fetched from the off-chip memory to the at least one memory before dividing, and the at least one processor may push the vectors and the fetched elements of the input matrix to one or more registers before executing the neural network. For example, the at least one processor may transfer a full weight matrix to the at least one memory (e.g., an on-chip memory of GPU 607) and use GPU 607 to divide the weight matrix into blocks and generate sparse weight matrix 601. In addition, as depicted in example 600 of FIG. 6, the at least one processor may push the vectors (e.g., as encoded in sparse weight matrix 601) to registers (e.g., operations registers 609-1, 609-2, 609-3, and 609-4) as well as elements of sparse input matrix 605 to registers (e.g., operations registers 609-1, 609-2, 609-3, and 609-4) before executing the neural network on GPU 607.

At step 709, the at least one processor may execute the neural network using the vectors and the enforced input sparsity. For example, as shown in example 600 of FIG. 6, in embodiments where one or more CPUs, GPUs, or the like generate sparse weight matrix 601, offset matrix 603, and sparse input matrix 605, a different CPU or GPU (e.g., GPU 607) may receive sparse weight matrix 601, offset matrix 603, and sparse input matrix 605 for executing the multiply-accumulate operations of the neural network.

In some embodiments, executing the neural network may comprise performing multiply-accumulate functions for each of the vectors and corresponding inputs, storing results of the multiply-accumulate functions in row-wise registers; and using a shuffle function to multiply-accumulate stored results in corresponding row-wise registers. Accordingly, as shown in example 600 of FIG. 6, GPU 607 may use operations registers (e.g., registers 609-1, 609-2, 609-3, and 609-4) to store the vectors and corresponding inputs for the multiply-accumulate functions, result registers (e.g., registers 611-1, 611-2, 611-3, and 611-4) for storing the results based on rows determined from offset matrix 603, and a shuffle operations for finalizing outputs from the result registers.

As further depicted in FIG. 6, the multiply-accumulate functions for each of the vectors and the corresponding inputs may be performed in parallel. For example, each vector may correspond to a parallel execution thread, each with corresponding operations registers (e.g., registers 609-1 for thread 0, registers 609-2 for thread 1, registers 609-3 for thread 2, and registers 609-4 for thread 3) and results registers (e.g., registers 611-1 for thread 0, registers 611-2 for thread 1, registers 611-3 for thread 2, and registers 611-4 for thread 3).

Additionally with or alternatively to method 750 of FIG. 7B, iterative re-training of the neural network may be performed using the example pseudocode below:

```
1   W = W₀ ;
2   Divide W into block_{i,j} ;
3   N_{zero} = 0 ;
4   E₀ = ValidationError(W) ;
5   E = E₀ ;

6   while  (E − E₀)/E₀  < E_δ  do

7       N_{zero} = N_{zero} + 1 ;
8       for each i,j do
9           Sort abs values of all elements in block[i][j] in ascending
                order;
10          Save sorted elements in sorted[M x N] ;
11          T_{ij} = sorted[N_{zero}] ;
12          for each element in block[i][j] do
13              Remove element if abs(element) < T_{ij} ;
14      Fine tune pruned W ;
15      E = ValidationError(W);
16  W_s = W ;
```

In the pseudocode above, input $W_0$ comprises a weight matrix for the neural network, inputs M and N define a block size for the pruning (e.g., using M×N blocks), and $E_\delta$ represents the maximum allowed accuracy drop. The pseudocode outputs $W_s$ as the pruned weight matrix for use in sparsely executing the neural network. In particular, after initializing variables in lines 1-5, lines 6-13 prune the weight matrix (e.g., by dividing $W_0$ into blocks and zeroing out a predetermined number of elements in each block), and lines 14 and 15 re-train the neural network on the pruned matrix. Lines 6-15 loop with lines 6-13 removing additional elements from each block per iteration until the accuracy of the re-trained neural network drops below $E_{67}$. At line 16, the pruned matrix is output.

Similar to the pseudocode described above, method 750 of FIG. 7B depicts a flowchart of an exemplary method 750 for re-training a neural network based on block-wise sparsity. Method 750 may be performed by at least one processor (e.g., processor 801 of FIG. 8, GPU 607 of FIG. 6, or the like). Accordingly, in some embodiments, the at least one processor and the at least one memory may be part of a graphics processing unit (GPU). Although described with respect to a single processor, some steps of method 750 may be performed by one or more first processors (e.g., steps 751, 753, and 755 of method 750 may be executed by one or more CPUs) while other steps of method 750 may be performed by one or more second processors (e.g., step 757 and 759 of method 750 may be executed by one or more GPUs). Although described with one iteration, method 750 may be use any number of iterations to re-train the neural network to a desired level of sparsity and accuracy.

Method 750 may be an alternative to method 700. In other embodiments, method 750 and method 700 may be combined. For example, a neural network re-trained according to method 750 may then be executed with the corresponding block-wise sparsity according to method 700.

At step 751, the at least one processor may divide a matrix of weights associated with a neural network into a plurality of blocks. For example, the at least one processor may divide a weight matrix 401 into a plurality of blocks (e.g., into block 403 and similar) as explained in division 400 of FIG. 4 and described above with respect to step 701 of method 700.

In some embodiments, the at least one processor may further pad a residue block of the plurality of blocks using zeroes. For example, as explained above with respect to division 400 of FIG. 4 and with respect to step 701 of method 700, if the M×N matrix does not divide evenly into blocks of $B_y \times B_x$, the at least one processor may pad one or more residual blocks with zeroes such that each block is the same size, i.e., $B_y \times B_x$.

At step 753, the at least one processor may extract non-zero elements from one or more of the plurality of blocks. For example, as depicted in block-wise sparsification 500 of FIG. 5 and described above with respect to step 703 of method 700, the at least one processor may extract a predetermined number of non-zero elements (e.g., selected elements 503a, 503b, 503c, and 503d) from block 501 based on a ranking of absolute values of the elements of block 501.

At step 755, the at least one processor may re-encode the extracted non-zero elements as vectors with associated coordinates of the extracted non-zero elements within the one or more blocks. For example, as depicted in block-wise sparsification 500 of FIG. 5 and described above with respect to step 705 of method 700, the at least one processor may generate sparse block 505 as a one-dimensional vector storing the extracted elements (e.g., selected elements 503a, 503b, 503c, and 503d) from block 501. Moreover, as further depicted in block-wise sparsification 500 of FIG. 5 and further described above with respect to step 705 of method 700, the at least one processor may determine coordinates of the extracted elements (e.g., selected elements 503a, 503b, 503c, and 503d) from block 501) within block 501 and store the coordinates in offset matrix 507.

In some embodiments, re-encoding the extracted non-zero elements may comprise re-encoding a predetermined number of the extracted non-zero elements. For example, as depicted in block-wise sparsification 500 of FIG. 5 and described above with respect to step 705 of method 700, the at least one processor may extract four (or any other predetermined number) of non-zero elements from block 501. In embodiments where a block has fewer non-zero elements than the predetermined number, the at least one processor may pad the re-encoded vectors with zeroes such that each vector is the same length (e.g., a length corresponding to the predetermined number). In such embodiments, the at least one processor may further, when there are more extracted non-zero elements for a block than the predetermined number, select a number of largest elements (e.g., largest absolute value) of the extracted non-zero elements corresponding to the predetermined number for re-encoding. Additionally or alternatively, the at least one processor may further, when there are fewer extracted non-zero elements for a block than the predetermined number, pad the extracted non-zero elements with zero elements to obtain a total number of elements corresponding to the predetermined number for re-encoding, as explained above.

In any of the embodiments described herein, each weight may be stored as one of a 32-bit floating point number of a 16-bit floating point number. Additionally or alternatively, the associated coordinates may be stored as four bits, a first two of the four bits indicating a location of the non-zero element within a corresponding block along a first dimension, and a second two of the four bits indicating a location of the non-zero element within the corresponding block along a second dimension. Accordingly, as explained above with respect to block-wise sparsification 500 of FIG. 5 and with respect to step 705 of method 700, the at least one processor may encode a position of the element (e.g., element 503a, 503b, 503c, or 503d) along a y-dimension of block 501 as the first two bits and a position of the element (e.g., element 503a, 503b, 503c, or 503d) along an x-dimension of block 501 as the second two bits. Any number of bits may be used depending on the length of the corresponding dimension, and the dimensions may be encoded in any order within the bits. Additionally with or alternatively to separate bits, the bits may be stored in a mantissa of the non-zero element.

At step 757, the at least one processor may enforce input sparsity in the neural network corresponding to the associated coordinates. For example, as depicted in example 600 of FIG. 6, the at least one processor may extract elements from a full input matrix based on offset matrix 603 to obtain sparse input matrix 605.

In some embodiments, enforcing input sparsity in the neural network may comprise fetching elements of an input matrix corresponding to the associated coordinates from an off-chip memory to the at least one memory. For example, as depicted in example 600 of FIG. 6 and described above with respect to step 707 of method 700, the at least one processor may extract elements from a full input matrix based on offset matrix 603 to obtain sparse input matrix 605 before transferring sparse input matrix 605 to the at least one memory (e.g., an on-chip memory of GPU 607) from the off-chip memory. Additionally or alternatively, the matrix of weights may be fetched from the off-chip memory to the at least one memory before dividing, and the at least one processor may push the vectors and the fetched elements of the input matrix to one or more registers before executing the neural network. For example, the at least one processor may transfer a full weight matrix to the at least one memory (e.g., an on-chip memory of GPU 607) and use GPU 607 to divide the weight matrix into blocks and generate sparse weight matrix 601. In addition, as depicted in example 600 of FIG. 6, the at least one processor may push the vectors (e.g., as encoded in sparse weight matrix 601) to registers (e.g., operations registers 609-1, 609-2, 609-3, and 609-4) as well as elements of sparse input matrix 605 to registers (e.g., operations registers 609-1, 609-2, 609-3, and 609-4) before executing the neural network on GPU 607.

Further at step 757, the at least one processor may re-train the neural network using the vectors and the enforced input sparsity. For example, the at least one processor ay apply a test data set or a training data set to the neural network executed with the block-wise sparsity obtained via steps 751, 753, 755, and 757, and modify the neural network accordingly to reduce one or more associated loss functions calculated after applying the test data set or the training data set.

At step 759, the at least one processor may determine if the re-trained neural network has converged. For example, the at least one processor may determine convergence has occurred when a desired sparsity level has been reached, when an accuracy of the neural network has dropped below a threshold (e.g., as performed by the pseudocode described above), or any other value associated with the neural network has reached or crossed a predetermined threshold. If converged, method 750 may end; if not, method 750 may iterate, as depicted in FIG. 7B.

Although described above with respect to one iteration, method 750 may further iteratively re-train the neural network using the vectors and the enforced input sparsity, divide a matrix of weights associated with the re-trained neural network into a second plurality of blocks, extract second non-zero elements from one or more of the second plurality of blocks, re-encode the extracted second non-zero elements as second vectors with associated second coordinates of the extracted second non-zero elements within the one or more second blocks, enforce further input sparsity in the neural network corresponding to the second associated coordinates, and re-train the re-trained neural network using the second vectors and the enforced further input sparsity. This iteration may end after a desired sparsity level has been reached or after an accuracy of the neural network has dropped below a threshold (e.g., as performed by the pseudocode described above). In such embodiments, the neural network obtained on the final iteration (or, in embodiments where the accuracy has dropped below the threshold, obtained on the penultimate iteration) may be executed or stored or otherwise finalized. Accordingly, as described with respect to step 759 (and as provided in the pseudocode set forth above), the at least one processor may halt the iteration when an accuracy of the re-trained neural network is below a threshold.

Any of the re-trainings described above may comprise modifying one or more elements of the matrix of weights or modifying one or more activation functions of one or more nodes of the neural network. For example, the at least one processor may modify the matrix of weights or the activation functions to minimize (or otherwise reduce) one or more loss functions associated with the neural network calculated after a test data set or a training data set is applied to the neural network.

Figure 7B:
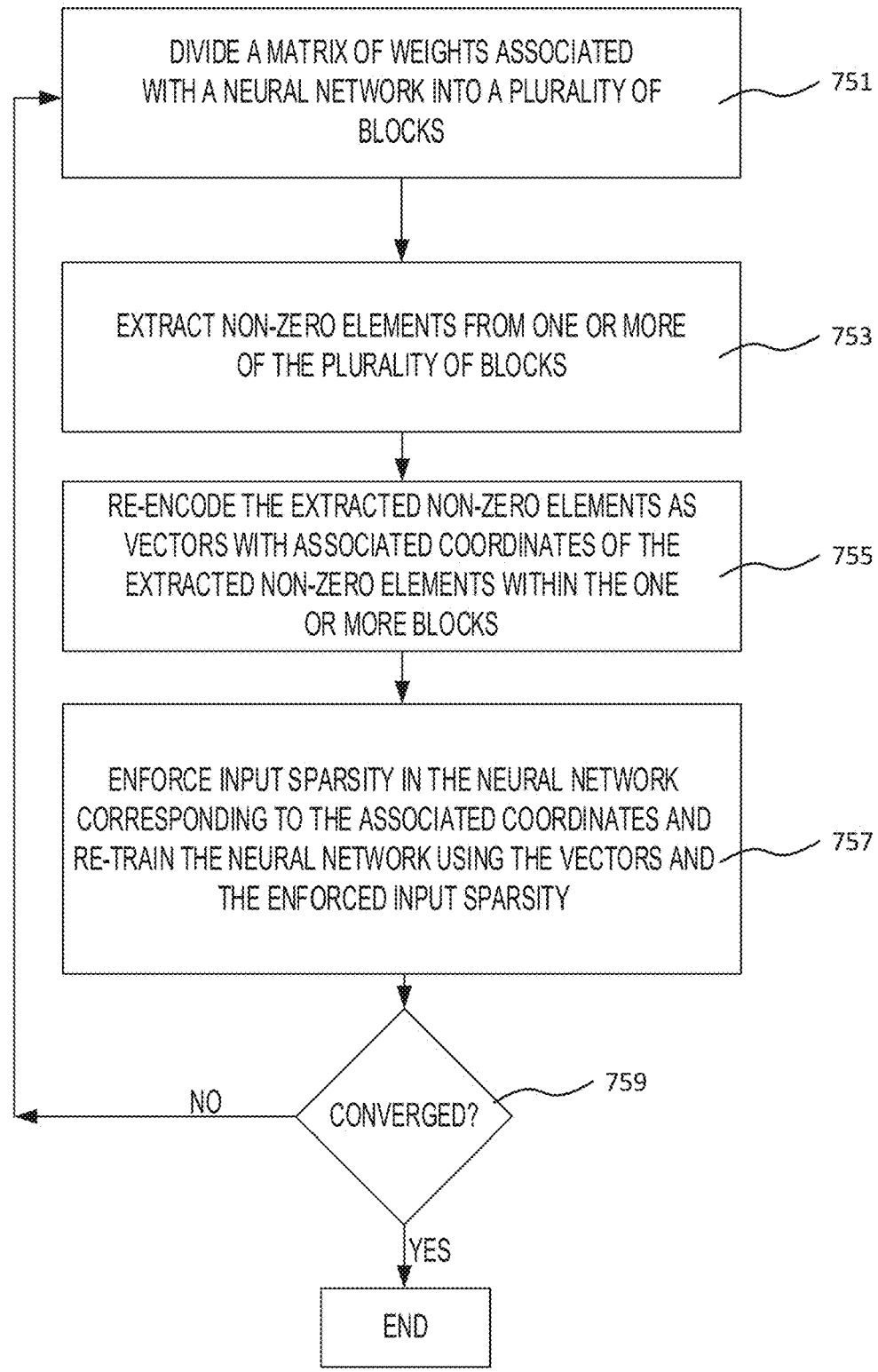
FIG. 7B is a flowchart of another exemplary method for providing block-wise sparsity in a neural network, according to embodiments of the present disclosure.

Although not depicted in FIG. 7B, the at least one processor may further execute the re-trained neural network after all iterations are complete, as described above. For example, similar to step 709 of method 700 of FIG. 7A and as shown in example 600 of FIG. 6, in embodiments where one or more CPUs, GPUs, or the like generate sparse weight matrix 601, offset matrix 603, and sparse input matrix 605, a different CPU or GPU (e.g., GPU 607) may receive sparse weight matrix 601, offset matrix 603, and sparse input matrix 605 for executing the multiply-accumulate operations of the neural network.

In some embodiments, executing the neural network may comprise performing multiply-accumulate functions for each of the vectors and corresponding inputs, storing results of the multiply-accumulate functions in row-wise registers; and using a shuffle function to multiply-accumulate stored results in corresponding row-wise registers. Accordingly, similar to step 709 of method 700 of FIG. 7A and as shown in example 600 of FIG. 6, GPU 607 may use operations registers (e.g., registers 609-1, 609-2, 609-3, and 609-4) to store the vectors and corresponding inputs for the multiply-accumulate functions, result registers (e.g., registers 611-1, 611-2, 611-3, and 611-4) for storing the results based on rows determined from offset matrix 603, and shuffle operations for finalizing outputs from the result registers.

As further explained in step 709 of method 700 of FIG. 7A and depicted in FIG. 6, the multiply-accumulate functions for each of the vectors and the corresponding inputs may be performed in parallel. For example, each vector may correspond to a parallel execution thread, each with corresponding operations registers (e.g., registers 609-1 for thread 0, registers 609-2 for thread 1, registers 609-3 for thread 2, and registers 609-4 for thread 3) and results registers (e.g., registers 611-1 for thread 0, registers 611-2 for thread 1, registers 611-3 for thread 2, and registers 611-4 for thread 3).

Figure 8:
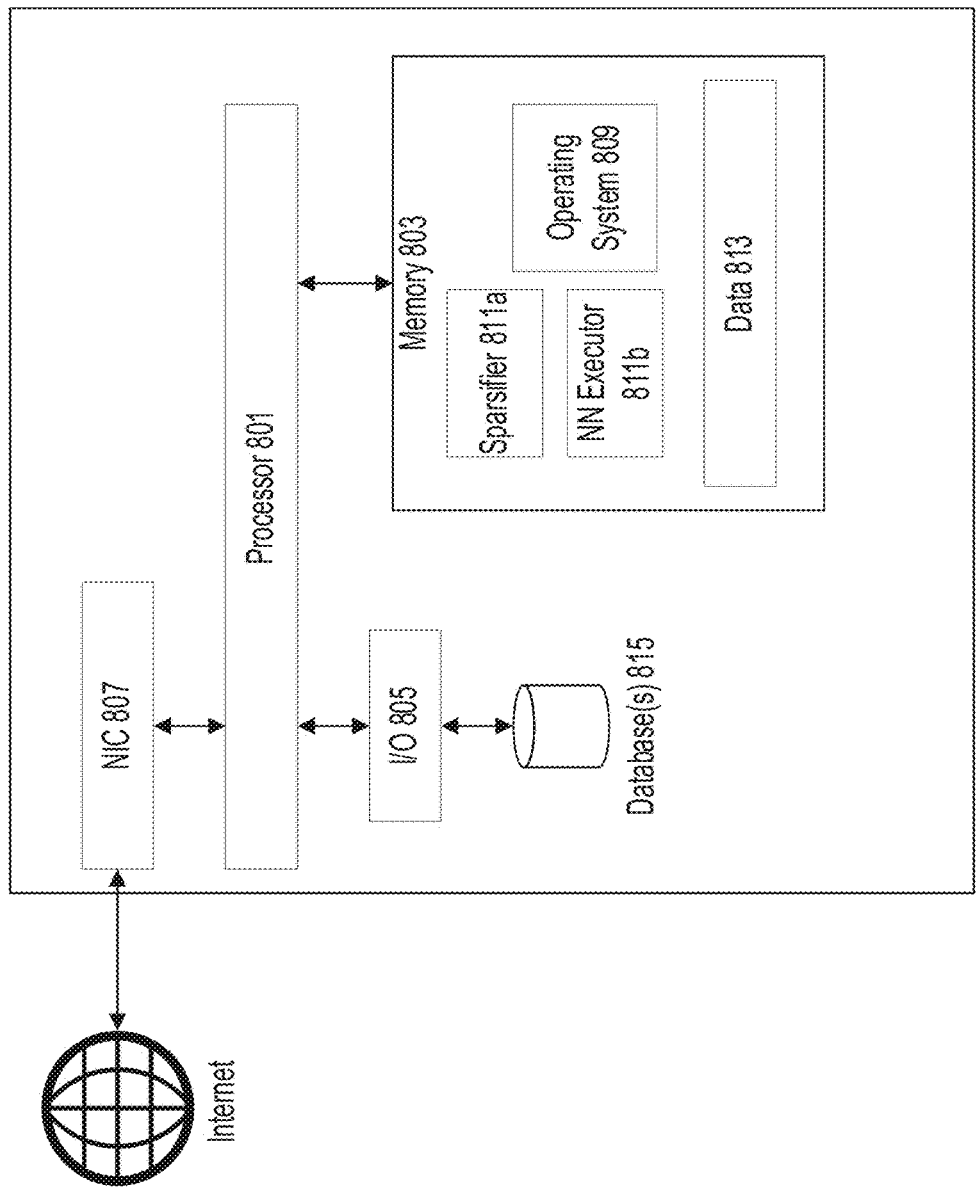
FIG. 8 is a depiction of an exemplary computer system for executing the methods of FIGS. 7A and 7B, according to embodiments of the present disclosure.

FIG. 8 is a depiction of an example system 800 for providing block-wise sparsity in a neural network, consistent with embodiments of the present disclosure. Although depicted as a server in FIG. 8, system 800 may comprise any computer, such as a desktop computer, a laptop computer, a tablet, or the like, configured with at least one processor to execute, for example, method 700 of FIG. 7A or method 750 of FIG. 7B.

As depicted in FIG. 8, computer 800 may have a processor 801. Processor 801 may comprise a single processor or a plurality of processors. For example, processor 801 may comprise a GPU (or a CPU) alone or in combination with one or more hardware accelerators, a reconfigurable array (e.g., an FPGA or other ASIC), or the like.

Processor 801 may be in operable connection with a memory 803, an input/output module 805, and a network interface controller (NIC) 807. Memory 803 may comprise a single memory or a plurality of memories. In addition, memory 803 may comprise volatile memory, non-volatile memory, or a combination thereof. As depicted in FIG. 8, memory 803 may store one or more operating systems 809, a sparsifier 811a, and a neural network (NN) executor 811b. Although depicted as part of memory 803, ternary random sparsifier 811a and NN executor 811b may comprise instructions built into or stored on processor 801.

Sparsifier 811a may include instructions to perform block-wise sparsity on a matrix of weights of a neural network (e.g., as explained in steps 701, 703, 705, and 707 of method 700 of FIG. 7A), and NN executor 811b may include instructions to execute a neural network with block-wise sparsity (e.g., as explained in step 709 of method 700 of FIG. 7A). Although not depicted in FIG. 8, memory 803 may further include instructions to re-train a neural network (e.g., as explained in steps 757 and 759 of method 750 of FIG. 7B) based on block-wise sparsity, e.g., provided by sparsifier 811a.

Input/output module 805 may store and retrieve data from one or more databases 815. For example, database(s) 815 may include a database of neural networks to be retrieved and used by sparsifier 811a, as described above, or a database of block-wise sparsified neural networks to be retrieved and executed by NN executor 811b, as described above.

NIC 807 may connect computer 800 to one or more computer networks. In the example of FIG. 8, NIC 807 connects computer 800 to the Internet. Computer 800 may receive data and instructions over a network using NIC 807 and may transmit data and instructions over a network using NIC 807. Moreover, computer 800 may receive neural networks (e.g., for use by sparsifier 811a) over a network using NIC 807, as described above.

EXAMPLE

Multiple simulations were developed and executed in order to demonstrate potential efficiency gains by using the disclosed techniques for executing neural networks. The simulations used a DGX-1 station equipped with NVIDIA® V100 GPUs. The matrix multiplication was implementing using CUTLASS, an open-source general matrix multiply (GEMM) template library. Moreover, the block size in all simulations was set to 4×4, and the station used 32-bit floating points to store weights as well as activations and gradients of the neural networks.

The techniques disclosed herein were tested on eight extant neural networks: the LeNet-300-100 model (a fully connected network with two hidden layers), the LeNet-5 model (a convolutional neural network with two convolutional layers and two fully connected layers), the AlexNet model (a convolutional neural network with five convolutional layers and three fully connected layers), the VGG-16 (a convolutional neural network with thirteen convolutional layers and three fully connected layers), ResNet-18 (a convolutional neural network with residual properties), ResNet-50 (another convolutional neural network with residual properties), the Show and Tell model (an Inception V3 convolutional neural network with a long short-term memory layer connected to the last layer of the convolutional neural network), and a Neural Machine Translations (NMT) model (a two-layer long short-term memory encoder, a four-layer long short-term memory decoder, and an attention module). Each network used one or more extant data sets. For example, LeNet-300-100 and LeNet-5 were applied to the Modified National Institute of Standards and Technology (MNIST) data set; AlexNet, VGG-12, ResNet-18, and ResNet-50 were applied to the 2012 ImageNet Large Scale Visual Recognition Challenge (ILSVRC-2012) data set; Show and Tell was applied to the Microsoft® Common Objects in Context (MSCOCO) data set; and NMT was applied to the 2016 Conference on Machine Translation (WMT 16) English-German data set.

The methods disclosed herein resulted in sparsity at least as high as 93.75% without loss of accuracy. However, the projected sparsity was network-specific. Table 1 shows the results of this example. Table 1 includes each model discussed above as executed with a particular configuration (Reference being no sparsity, Unified referring to unified sparsification, and Block-wise referring to the example disclosed herein, where K is the number of non-zero values left in each block). Table 1 was generated by incrementing block-wise sparsity until accuracy of the neural network dropped. The accuracy for Show and Tell and NMT is measured using a Bilingual Evaluation Understudy Score (BLEU) scaled to be between 0 and 100 rather than 0 and 1.

TABLE 1

| Model | Configuration | Sparsity | Top-1 Accuracy |
|---|---|---|---|
| LeNet-300-100 | Reference | n/a | 98.36% |
| | Unified | 90% | 98.31% |
| | Block-wise, 4 × 4, K = 1 | 93.75% | 98.40% |
| LeNet-5 | Reference | n/a | 99.20% |
| | Unified | 90% | 99.12% |
| | Block-wise, 4 × 4, K = 1 | 93.75% | 99.23% |
| AlexNet | Reference | n/a | 57.22% |
| | Unified | 50% | 49.36% |
| | Block-wise, 4 × 4, K = 4 | 75% | 57.22% |
| VGG-16 | Reference | n/a | 68.50% |
| | Unified | 50% | 52.93% |
| | Block-wise, 4 × 4, K = 3 | 81.25% | 68.66% |
| ResNet-18 | Reference | n/a | 69.02% |
| | Unified | 50% | 53.10% |
| | Block-wise, 4 × 4, K = 4 | 75% | 69.05% |
| ResNet-50 | Reference | n/a | 74.30% |
| | Unified | 50% | 58.22% |
| | Block-wise, 4 × 4, K = 4 | 75% | 72.91% |
| | Block-wise, 4 × 4, K = 5 | 68.75% | 74.31% |
| Show and Tell | Reference | n/a | 31.0 BLEU |
| | Unified | 50% | 29.2 BLEU |
| | Block-wise, 4 × 4, K = 4 | 75% | 31.1 BLEU |
| NMT | Reference | n/a | 23.60 BLEU |
| | Unified | 50% | 18.92 BLEU |
| | Block-wise, 4 × 4, K = 4 | 75% | 23.75 BLEU |

As shown in Table 1, most models remain accurate even at 75% or greater weight sparsity using block-wise sparsity as disclosed herein. Indeed, LeNet-300-100 and LeNet-5 reached 93.75% weight sparsity without loss of accuracy. Larger models, such as AlexNet, VGG-16, ResNet-18, and ResNet-50, are more likely to suffer from greater sparsity, e.g., losing at least 15% accuracy when unified sparsity is applied at 50%. However, as Table 1 shows, block-wise sparsity may achieve weight sparsity of 68.75% or greater in these networks without loss of accuracy.

Figure 9:
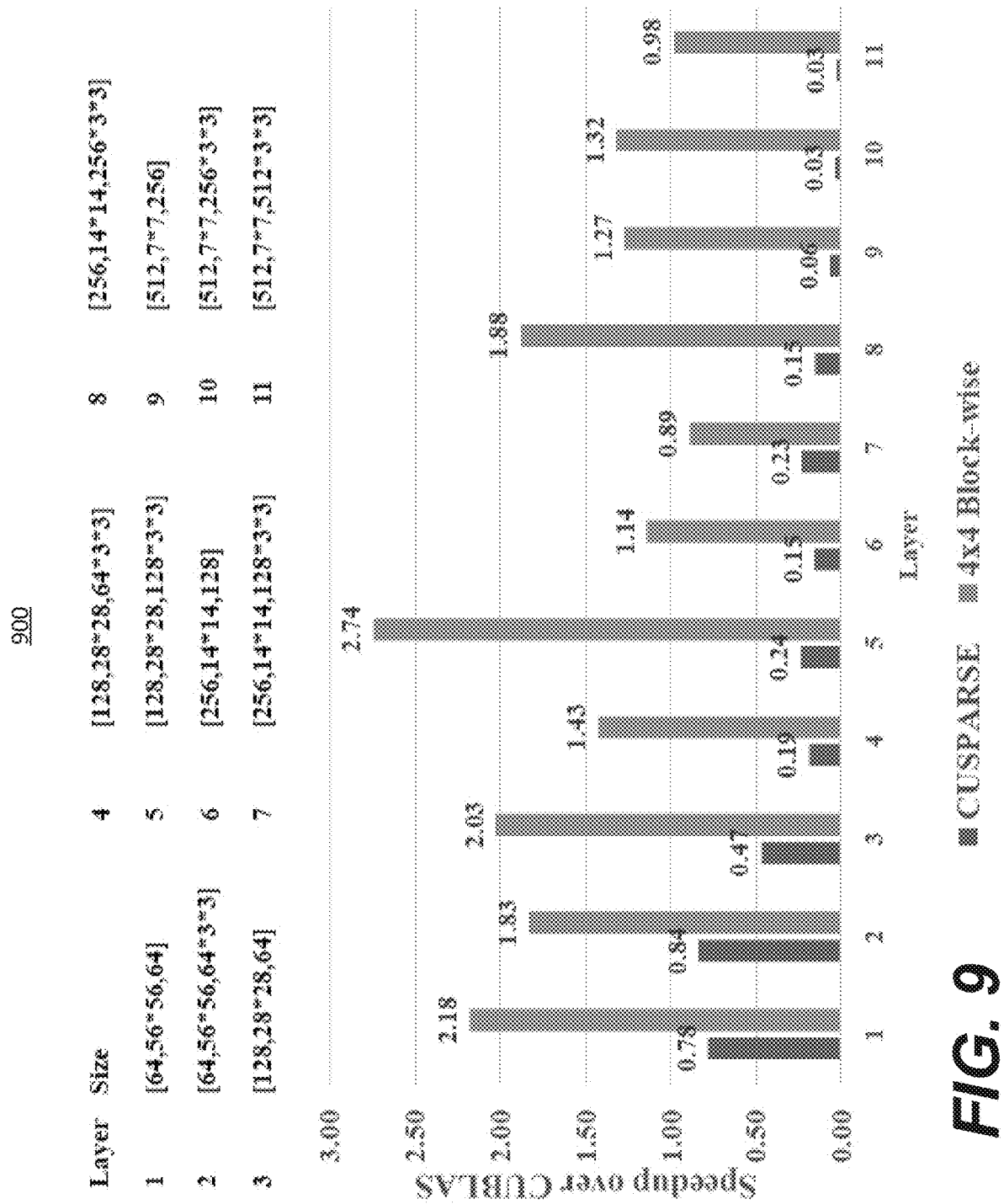
FIG. 9 is a graphical depiction of simulated speedup on convolutional layers of a neural network benchmark by implementing one example of the embodiments of the present disclosure.

Moreover, as depicted in FIG. 9, implementing the block-wise sparsity in these examples may achieve speedup over the cuBLAS library when executing the convolutional layers of ResNet-18 on the example station described above. In addition, FIG. 9 depicts how the cuSPARSE library is even less efficient than the cuBLAS library when executing the same layers on the example station described above.

Figure 10:
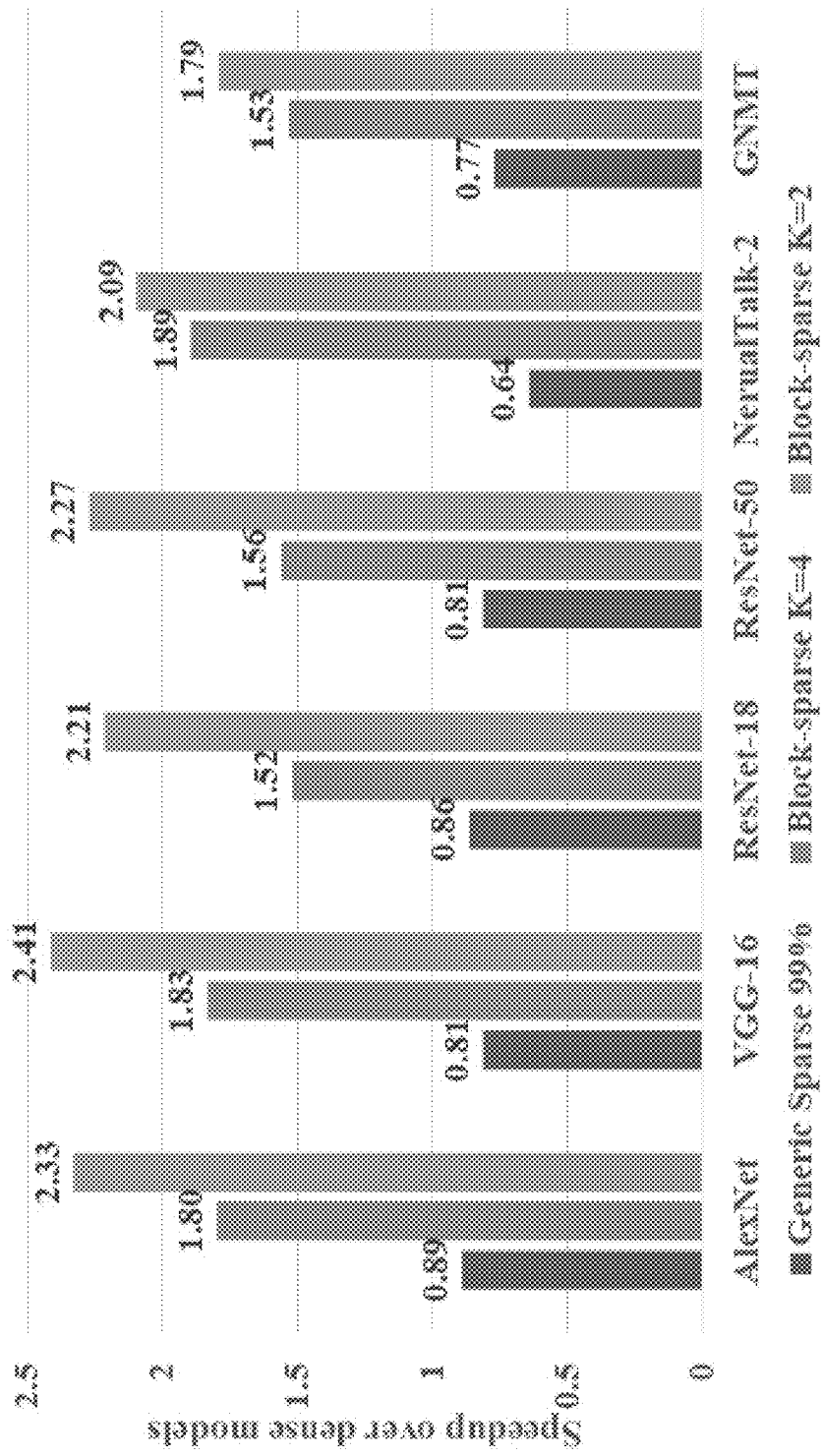
FIG. 10 is a graphical depiction of simulated overall speedup on convolutional neural network (CNNs) and recurrent neural network (RNNs) benchmarks by implementing one example of the embodiments of the present disclosure.

FIG. 10 depicts overall speedup for six neural networks (AlexNet, VGG-16, ResNet-18, ResNet-50, NerualTalk-2, and Google's Neural Machine Translation (GNMT) model) for block-wise sparsity with K=2, block-wise sparsity with K=4, and generic sparsity set to 99%. As shown in FIG. 10, using 4×4 block-wise sparsity in the implementation described may achieve a 69% average speedup when K=4 and 118% when K=2.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be constnied as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for providing block-wise sparsity in a neural network, comprising:
   at least one memory storing instructions; and
   at least one processor configured to execute the instructions to cause the system to perform:
     dividing a matrix of weights associated with a neural network into a plurality of blocks;
     extracting non-zero elements from each of the plurality of blocks;
     re-encoding the extracted non-zero elements from each block as a vector with an associated offset matrix of coordinates of the extracted non-zero elements from the block;
     enforcing input sparsity in the neural network corresponding to the offset matrix, wherein enforcing input sparsity includes fetching elements of an input matrix corresponding to the coordinates in the offset matrix from an off-chip memory to the at least one memory; and
     executing the neural network using the vectors and the enforced input sparsity.

2. The system of claim 1, wherein the at least one processor further executes the instructions to cause the system to perform padding a residue block of the plurality of blocks using zeroes.

3. The system of claim 1, wherein the at least one processor further executes the instructions to cause the system to perform re-training of the neural network using the vectors and the enforced input sparsity.

4. The system of claim 3, wherein the re-training includes at least one of modifying one or more elements of the matrix of weights or modifying one or more activation functions of one or more nodes of the neural network.

5. The system of claim 3, wherein the at least one processor further executes the instructions to cause the system to iteratively perform:
dividing a matrix of weights associated with the re-trained neural network into a second plurality of blocks;
extracting second non-zero elements from each of the second plurality of blocks;
re-encoding the extracted second non-zero elements from each second block as a second vector with an associated second offset matrix of coordinates of the extracted second non-zero elements from the second block;
enforcing further input sparsity in the neural network corresponding to the second offset matrix, wherein enforcing input sparsity includes fetching elements of an input matrix corresponding to the coordinates in the second offset matrix from the off-chip memory to the at least one memory; and
re-training the re-trained neural network using the second vectors and the enforced further input sparsity.

6. The system of claim 5, wherein the at least one processor further executes the instructions to cause the system to halt the iteration when an accuracy of the re-trained neural network is below a threshold.

7. The system of claim 1, wherein the at least one processor and the at least one memory are part of a graphics processing unit (GPU).

8. The system of claim 7, wherein the GPU executes the neural network by:
performing multiply-accumulate functions for each of the vectors and corresponding inputs;
storing results of the multiply-accumulate functions in row-wise registers; and
using a shuffle function to multiply-accumulate stored results in corresponding row-wise registers.

9. The system of claim 8, wherein the multiply-accumulate functions for each of the vectors and the corresponding inputs are performed in parallel.

10. The system of claim 9, wherein each vector corresponds to a parallel execution thread.

11. The system of claim 1, wherein each weight is stored as one of a 32-bit floating point number or a 16-bit floating point number.

12. The system of claim 1, wherein the associated coordinates are stored as four bits, a first two of the four bits indicating a location of the non-zero element within a corresponding block along a first dimension, and a second two of the four bits indicating a location of the non-zero element within the corresponding block along a second dimension.

13. The system of claim 12, wherein the four bits are stored in a mantissa of the non-zero element.

14. The system of claim 1, wherein re-encoding the extracted non-zero elements further comprises re-encoding a predetermined number of the extracted non-zero elements.

15. The system of claim 14, wherein re-encoding the predetermined number of the extracted non-zero elements further comprises:
when there are more extracted non-zero elements for a block than the predetermined number, selecting a number of largest elements of the extracted non-zero elements corresponding to the predetermined number for re-encoding; and
when there are fewer extracted non-zero elements for a block than the predetermined number, padding the extracted non-zero elements with zero elements to obtain a total number of elements corresponding to the predetermined number for re-encoding.

16. The system of claim 1, wherein the matrix of weights is fetched from the off-chip memory to the at least one memory before dividing, and wherein the at least one processor further executes the instructions to cause the system to perform pushing the vectors and the fetched elements of the input matrix to one or more registers before executing the neural network.

17. A method for providing block-wise sparsity in a neural network, comprising:
dividing a matrix of weights associated with a neural network into a plurality of blocks;
extracting non-zero elements from one or more each of the plurality of blocks;
re-encoding the extracted non-zero elements from each block as vectors a vector with an associated offset matrix of coordinates of the extracted non-zero elements within from the one or more blocks block;
enforcing input sparsity in the neural network corresponding to the associated coordinates offset matrix, wherein enforcing input sparsity includes fetching elements of an input matrix corresponding to the coordinates in the offset matrix from an off-chip memory to the at least one memory; and
executing the neural network using the vectors and the enforced input sparsity.

18. The method of claim 17, further comprising:
re-training of the neural network using the vectors and the enforced input sparsity;
dividing a matrix of weights associated with the re-trained neural network into a second plurality of blocks;
extracting second non-zero elements from each of the second plurality of blocks;
re-encoding the extracted second non-zero elements from each second block as a second vector with an associated second offset matrix of coordinates of the extracted second non-zero elements from the second block;
enforcing further input sparsity in the neural network corresponding to the second offset matrix, wherein enforcing input sparsity includes fetching elements of an input matrix corresponding to the coordinates in the second offset matrix from the off-chip memory to the at least one memory; and
re-training the re-trained neural network using the second vectors and the enforced further input sparsity.

19. A non-transitory computer-readable storage medium storing a set of instructions that is executable by at least one processor to cause the at least one processor to perform a method for providing block-wise sparsity in a neural network, the method comprising:
dividing a matrix of weights associated with a neural network into a plurality of blocks;
extracting non-zero elements from one or more each of the plurality of blocks;
re-encoding the extracted non-zero elements from each block as vectors a vector with an associated offset matrix of coordinates of the extracted non-zero elements within from the one or more blocks block;

enforcing input sparsity in the neural network corresponding to the associated coordinates offset matrix, wherein enforcing input sparsity includes fetching elements of an input matrix corresponding to the coordinates in the offset matrix from an off-chip memory to the at least one memory; and executing the neural network using the vectors and the enforced input sparsity.

\* \* \* \* \*

UNITED STATES PATENT AND TRADEMARK OFFICE
CERTIFICATE OF CORRECTION

PATENT NO. : 11,755,903 B2  
APPLICATION NO. : 16/521564  
DATED : September 12, 2023  
INVENTOR(S) : Maohua Zhu Page 1 of 1

It is certified that error appears in the above-identified patent and that said Letters Patent is hereby corrected as shown below:

In the Claims

Claim 17, Column 20, Line 21, "one or more each" should read as --each--.

Claim 17, Column 20, Line 24, "as vectors a vector" should read as --as a vector--.

Claim 17, Column 20, Line 26, "within from" should read as --from--.

Claim 17, Column 20, Line 26, "one or more blocks block" should read as --block--.

Claim 17, Column 20, Line 28, "associated coordinates offset matrix" should read as --offset matrix--.

Claim 19, Column 20, Line 62, "one or more each" should read as --each--.

Claim 19, Column 20, Line 65, "vectors a vector" should read as --a vector--.

Claim 19, Column 20, Line 67, "within from" should read as --from--.

Claim 19, Column 20, Line 67, "one or more blocks block" should read as --block--.

Claim 19, Column 21, Line 2, "associated coordinates offset matrix" should read as --offset matrix--.

Signed and Sealed this  
Thirtieth Day of December, 2025

John A. Squires  
*Director of the United States Patent and Trademark Office*